United States Patent [19]
Hopkins

[11] 3,864,929
[45] Feb. 11, 1975

[54] ABSORPTION REFRIGERATION SYSTEM

[75] Inventor: Neil E. Hopkins, York, Pa.

[73] Assignee: Borg-Warner Corporation, Chicago, Ill.

[22] Filed: Dec. 5, 1973

[21] Appl. No.: 421,896

[52] U.S. Cl. .......................... 62/101, 62/476, 62/119
[51] Int. Cl. ............................................. F25b 15/06
[58] Field of Search .............. 62/101, 119, 141, 476

[56] References Cited
UNITED STATES PATENTS

| | | | |
|---|---|---|---|
| 3,276,217 | 10/1966 | Bourne et al. .......................... | 62/101 |
| 3,640,084 | 2/1972 | Hopkins et al. ..................... | 62/476 X |
| 3,744,265 | 7/1973 | Bawel ................................... | 62/141 |

*Primary Examiner*—William F. O'Dea
*Assistant Examiner*—Peter D. Ferguson

[57] ABSTRACT

An absorption refrigeration machine which is constructed to operate in a normal manner wherein an absorbent solution is utilized as the driving force to absorb vapor released under subatmospheric conditions from a refrigerant, such as water, and also in a mode wherein the cooling water circulated through the absorber tube bundle condenses refrigerant vapor released from the evaporator tube bundle. A pan is located between the normal solution level in the absorber and the absorber heat exchanger which empties into the absorber sump during normal operation but functions as a receiver for refrigerant during the "free cooling" operation. This construction eliminates the requirement for an auxiliary receiver to hold the solution or brine during free cooling operations.

4 Claims, 3 Drawing Figures

ABSORPTION REFRIGERATION SYSTEM

BACKGROUND AND SUMMARY OF THE INVENTION

This invention is an improvement of the system described and claimed in U.S. Pat. No. 3,640,084 entitled "Refrigeration System and Method" issued to N. E. Hopkins et al., on Feb. 8, 1972. In the above-identified patent, there is described a refrigeration system of the type normally operated in the conventional absorption refrigeration cycle. When a cooling medium such as cooling tower water is available at temperatures below that which will satisfy the refrigeration load, the supply of heat to the generator is reduced to maintain the solution about 60°F above the refrigerant temperature, to prevent vapor migration to the solution. The absorber is then operated as a condenser to liquify the refrigerant in the evaporator. During the changeover, as explained in considerable detail in the Hopkins et al. patent, the brine, usually a hygroscopic solution of lithium bromide or similar salts, is pumped out of the absorber and stored in a receiver. This normally requires about 10 to 15 minutes during the changeover period and requires a rather complicated and expensive piping and holding tank arrangement for transfer and storage of the brine. In any absorption system, the pipes, pumps, valves and other related fluid handling means are of critical importance in that all such systems operate at an extremely low pressure (10 to 100 mm of Hg absolute). It is therefore imperative that all such means be carefully sealed against the admission of atmospheric air which will raise the pressure of the system and place an increased burden on the purging device required to remove the noncondensible gases, principally air.

In the present invention it is proposed to furnish the absorber with a pan inside the evaporator-absorber shell capable of receiving the flow of refrigerant during the free cooling operations and delivering it to the refrigerant circulation system. It is understood that the term "free cooling" is the alternative refrigeration cycle in which the generator is discontinued (excepting for migration control and blowdown action explained below) and relatively cold water from any source is supplied to the absorber so that it is capable of condensing water vapor released in the evaporator. The pan is designed to allow passage of solution during normal refrigeration operation and prevent passage of refrigerant during free cooling operations. Accordingly, such means prevents substantially all flow of refrigerant to the absorbent solution during the free cooling mode.

The tendency for refrigerant to migrate from the refrigerant circuit to the solution circuit is prevented by using a smaller amount of heat to heat the solution approximately 60°F above the refrigerant temperature. This is accomplished by pumping a small amount of solution from the absorber to the generator, to be returned to the absorber sump, and controlling the amount of generator heat to prevent migration of refrigerant. By this means, a small amount of water vapor is continuously driven from the solution stream, and condensing in the condenser or absorber circuits to build up the refrigerant volume in the refrigerant circuit. Then by the overflow in the evaporator pan there is a small amount of water blow down from the evaporator circuit into the absorber solution, tending to serve as a means of reducing any residual salt content in the refrigerant. For example, at the end of the normal cooling cycle, there tends to be a certain amount of salt in the refrigerant. It is advisable during the free cooling operation to reduce this salt content and this blow down means, wherein a small excessive amount of heat is applied to the generator will bring this about.

Of interest is the disclosure in U.S. Pat. No. 3,276,217 issued to J. R. Bourne et al., on Oct. 4, 1966. This Bourne et al. patent shows a pan arranged inside the absorber section and discharging solution directly into the solution line. The purpose of this construction is entirely different because the sump portion of the shell is used to store excess solution during normal operation (low load conditions).

DETAILED DESCRIPTION OF THE INVENTION

Figure 1:
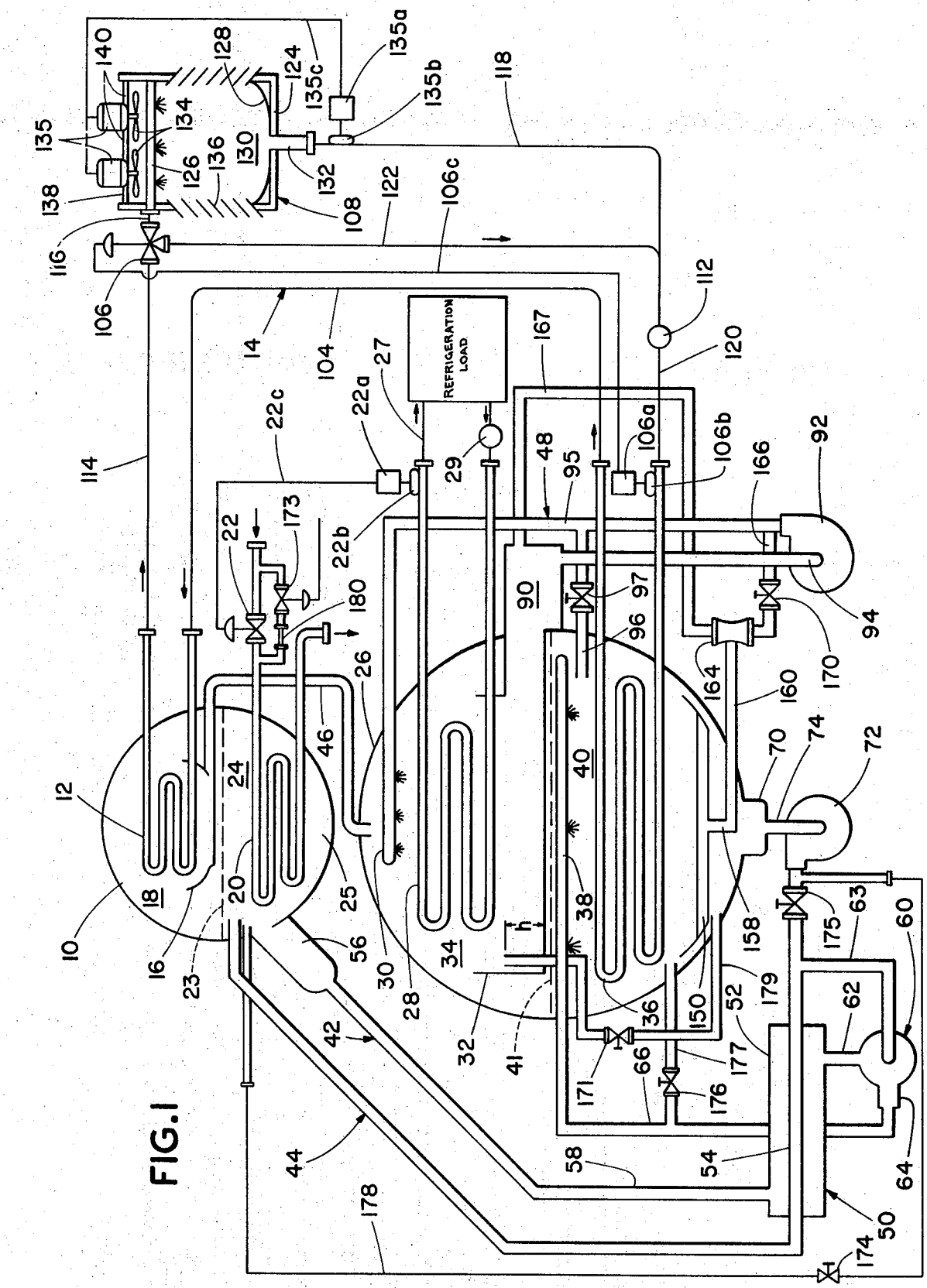
FIG. 1 is a schematic or diagrammatic view showing an absorption refrigeration system constructed in accordance with the principles of the present invention.

Referring to FIG. 1, an upper shell 10 encloses a heat exchanger 12, hereinafter referred to as the condenser coil and forming a portion of a cooling circuit 14. Positioned below condenser coil 12 is a receptacle means in the form of a pan 16 which cooperates with condenser coil 12 and the upper portion of shell 10 to provide a condenser 18.

In the lower portion of shell 10 there is provided a heat exchanger 20, hereinafter referred to as the generator coil, in which flow of a heating medium such as steam or hot water is regulated by a valve 22, the direction of flow being indicated by arrows. Valve 22 is connected to a control means 22a by a control line 22c. Control means 22a is, in turn, connected in any suitable manner to a temperature-sensitive element 22b. Generator coil 20 forms a portion of a heating circuit which also includes pump means as necessary, and a suitable source of heat, neither of which is shown. The lower portion of shell 10 and the generator coil 20 cooperate to provide a generator 24, a generator sump 25 being formed by the lowermost portion of shell 10. A dashed line 23 represents an imaginary plane of demarcation between condenser 18 and generator 24.

A lower shell 26 encloses a heat exchanger 28, hereinafter referred to as the evaporator coil, which forms a portion of a chilling circuit indicated generally at 27 and arranged to circulate chilled fluid to a refrigeration load represented schematically but typically consisting of one or more air conditioning units. Also included is a pump 29. The direction of flow in chilling circuit 27 is indicated by arrows. Positioned above evaporator coil 28 is a refrigerant distribution means in the form of a spray header 30 having spray nozzles arranged to distribute refrigerant over chilling coil 28 in heat exchange relation therewith. Below chilling coil 28 is a receptacle means in the form of a pan 32 for collecting liquid refrigerant. Evaporator coil 28, spray header 30, pan 32, and the upper portion of shell 26 cooperate to provide an evaporator 34.

Below pan 32 there is provided a heat exchanger 36, hereinafter referred to as the absorber coil, which forms a portion of cooling circuit 14, condenser coil 12 being arranged in series with absorber coil 36. A spray header 38 positioned above coil 36 is provided with a number of spray nozzles. Spray header 38, the lower portion of shell 26 and cooling coil 36 cooperate to provide an absorber 40, the nozzles of spray header 38 being arranged to distribute an absorbent solution in the upper portion of absorber 40. A dashed line 41 represents an imaginary plane of demarcation between evaporator 24 and absorber 40.

Condenser 18, generator 24, evaporator 34 and absorber 40 are connected in a closed circuit for conducting the refrigerant and the absorbent solution in an absorption refrigeration cycle. The closed circuit also includes a concentrated solution passage means 42, a dilute solution passage means 44, a condensate line 46, and a refrigerant passage means 48. A shell-and-tube heat exchanger, represented schematically at 50, and referred to hereinafter as the solution heat exchanger, includes a shell side 52 which forms a portion of concentrated solution passage means 42, and a tube side 54 which forms a portion of dilute solution passage means 44. Concentrated solution passage means 42 also includes a concentrated solution receiver 56 communicating with generator 24, and a line 58 connecting concentrated solution receiver 56 with shell side 52 of heat exchanger 50. An eductor 60 is also included in concentrated solution passage means 42, the eductor having an outlet 64 and a suction inlet 62, the latter communicating with shell side 52. A line 66 connecting eductor outlet 64 and spray header 38 completes concentrated solution passage means 42.

Absorbent solution is collected in a sump 70 at the lower portion of shell 26 and delivered to the inlet side of solution pump 72 through line 74. Fluid at pump discharge pressure flows through line 63 to drive the eductor 60.

Condensate line 46 connects pan 16 with evaporator 34 for delivery of condensed refrigerant to the evaporator. Refrigerant passage means 48 connects pan 32 with spray header 30 and includes a refrigerant receiver 90 communicating with pan 32, a refrigerant pump 92, a line 94 connecting refrigerant receiver 90 with the refrigerant pump inlet, and a line 95 connecting the refrigerant pump outlet with spray header 30. A blowdown line 96 communicates at one end thereof with line 95 and at the other end thereof with absorber 40. A blowdown valve 97, which is normally closed, is provided to control flow through the blowdown line.

In addition to condenser coil 12 and absorber coil 36, cooling circuit 14 includes a line 104 for conducting a cooling medium from absorber coil 36 to condenser coil 12, a three-way valve 106, a cooling tower 108, a pump 112, a line 114 leading from condenser coil 12 to three-way valve 106, a line 116 leading from the three-way valve to the cooling tower, a line 118 leading from the cooling tower to pump 112, a line 120 leading from the pump to absorber coil 36, and a bypass line 122 leading from three-way valve 106 to line 120. Arrows indicate the direction of flow in cooling circuit 14, including condenser coil 12, absorber coil 36 and bypass line 120. Three-way valve 106 is connected to a control means 106a by a control line 106c. Control means is, in turn, connected by any suitable means to a temperature-sensitive element 106b.

Cooling tower 108 typically includes a housing 124, a spray header 126 communicating with line 116 and having a number of spray nozzles, a receptacle means in the form of a cold-water basin 128 forming a sump 130, a cooling medium receiver 132 communicating with sump 130 and with line 118, and a plurality of fans 134, which may be driven directly, as shown, by electric motors 135, or by intermediate speed reduction mechanisms (not shown). Motors 135 are connected to a control means 135a by a control line 135c. Control means 135a is, in turn, connected by any suitable means to a temperature-sensitive element 135b sensing the temperature of water in line 118. Housing 124 is provided with a plurality of louvered intake openings 136, a number of exhaust openings 138, and suitable mounting supports 140 for fans 134 and motors 135.

During the free cooling cycle, it is necessary to circulate a small amount of solution from the absorber pan to the generator. Valve 175 is closed and a small circulation line 178 from the discharge of the solution pump to the generator is used, with valve 174 being opened during the free cooling phase (otherwise closed). Solution pump 72 is therefore operated during the free cooling cycle.

In order to prevent solution returning from the generator from flowing over the absorber surface, bypass line 177 is provided, with automatic valve 176 open during the free cooling phase, to dump the warm solution from the generator into the absorber solution sump without involving the absorber surface.

During the free cooling cycle, it is necessary that the solution in the solution containing parts be at a medium concentration. That is, it should not be relatively high, in the order of 64 percent corresponding to maximum cooling capacity during the cooling cycle, nor should it be low in the order of say 53 percent corresponding to low load in the normal cooling cycle. Instead, it should be somewhere in between, say around 58 percent, which will provide ample refrigerant volume in the refrigerant circuit and maintain the solution level in the absorber sump at an intermediate point. The control of this solution concentration and solution level is brought about by evaporator pan dump line 179, through automatic valve 171 which opens during the free cooling phase and closes during the normal cooling phase. This dump line, with overflow level at level $h$ as shown on the drawing, permits build up of refrigerant to that level, and with a small amount of excessive heat applied at the generator there is a corresponding amount of refrigerant blow-down through the blow-down line. This maintains the proper solution and refrigerant levels for the free cooling cycle, and permits a small amount of blow-down for the residual salt reduction in the refrigerant circuit.

Automatic steam valve 173 is provided around the main stream valve 22. During the free cooling cycle, the main valve is closed and the small bypass valve 173 is opened. An orifice 180 in the bypass steam line is sized to permit the required amount of bypass steam to maintain this function.

In general, most of the structure heretofore described is common to a great many existing absorption refrigeration systems. Any number of additional features or modifications may be found in such systems but do not play any part in the present invention and have been omitted for the sake of clarity. Among these, for example, are purge devices for the removal of noncondensible gases from the system, means for decrystallizing salts which may precipitate from solution in the shell side of the heat exchanger under conditions of relatively high concentration, and a solution valve which may be associated with dilute solution passage means for reducing the rate of flow of solution therein at reduced capacities.

The invention is equally applicable to systems in which the eductor is omitted or to those in which a second solution pump (in place of the eductor) is provided to circulate solution to the absorber for distribution therein. In addition, the cooling water control may be completely omitted in accordance with the system described in copending application Ser. No. 278,412 filed by N. E. Hopkins on Aug. 7, 1972.

In the system described in the aforementioned U.S. Pat. No. 3,640,084, a changeover to free cooling is accomplished by first pumping the absorption solution out of the absorber and storing it in an auxiliary receiver. With the absorber emptied of solution, the lower portion of the absorber evaporator shell is then capable of receiving the refrigerant condensed on the absorber heat exchanger. This refrigerant is then introduced into a refrigerant recirculation system and sprayed over the evaporator heat exchanger where it abstracts heat from the chilled water circuit. This process is continuous so that the refrigerant vapor boiled off in the evaporator is condensed in the absorber section and then directed back to the evaporator.

In the present invention, the auxiliary receiver is eliminated and the absorbent solution is retained in the sump portion of the absorber-evaporator shell. A pan is located underneath the lowest tube section of the absorber heat exchanger and is provided with a discharge opening preferably located over the sump feeding the suction side of the solution pump. Interposed in the path of solution flow is a trough or other means for intercepting fluid through which the solution must pass on its way to the solution pump. The trough is connected by means of conduits to the refrigerant recirculation system. When the system is functioning during free cooling operations, the refrigerant is collected in the trough and carried back to the refrigerant pump to be introduced into the evaporator sprays. When "normal" operation is resumed, the refrigerant lines to the trough are closed so that the solution simply overflows the trough and spills into the lower portion of the absorber shell where it is picked up by the solution pump and circulated back to the absorber sprays and the generator.

Figure 2:
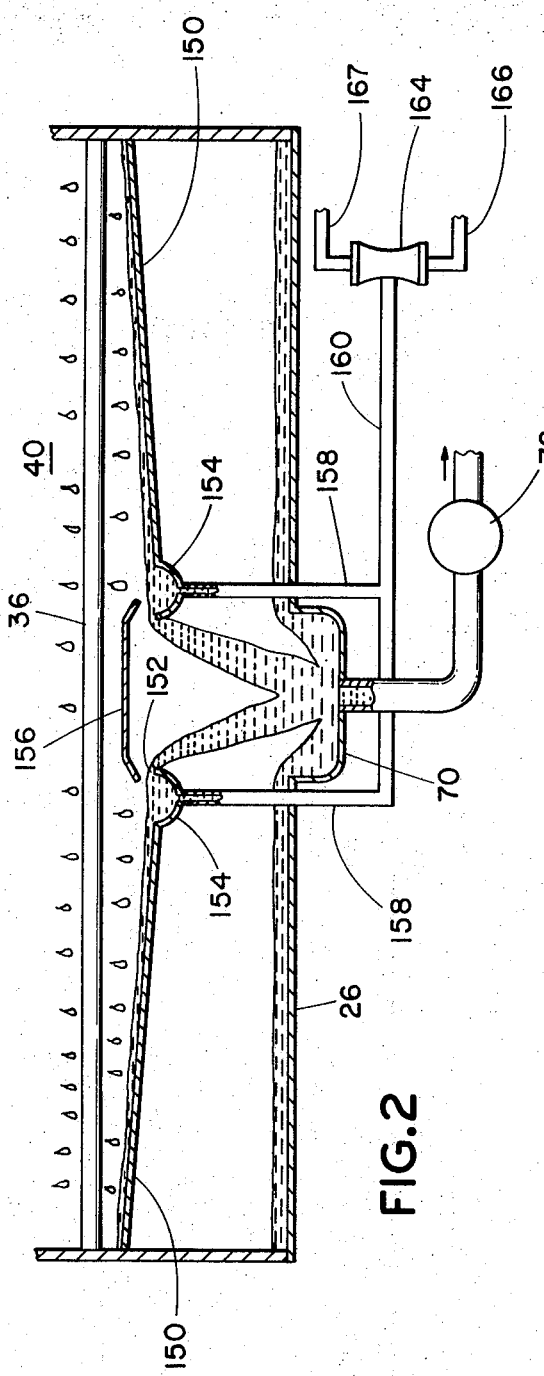
FIG. 2 is a partial longitudinal section through the lower half of the evaporator-absorber shell showing the system operating under normal cooling conditions.

As best seen in FIG. 2, which shows the operation of the system during the normal absorption cycle, pan 150 extends positioned longitudinally of the absorber tube bundle 36 and is positioned above the highest level of solution expected in the absorber shell and below the lowest tube in the absorber tube bundle. The pan extends from opposite ends of the shell and slopes downwardly toward the center where an opening 152 is provided above the sump or receiver 70 collecting solution for flow to the suction side of the solution pump 72. Immediately around the opening is a trough or collector 154 into which the solution must flow before it passes through the opening. This trough may be a continuously generally circular form or it may be arranged in any suitable manner to intercept the flow. In the preferred embodiment, a baffle 156 is located over the opening to prevent direct flow of liquid through the opening for a reason to be described in more detail below. The trough 154 is interconnected to the refrigerant circuit by means of conduits 158, 160 and which connect it to the suction side of an ejector 164. The motive fluid for ejector 164 is provided by a tap-off 166 from the discharge side of refrigerant pump 92, and the mixed stream is directed through line 167 to the upper portion of the refrigerant collection pan 90 adjacent the evaporator tube bundle 28. The valve 170 in tap-off line 166 is closed during normal cooling so that the ejector is inoperative. The solution thus overflows the trough 154 spilling into sump 70 and is pumped by solution pump 72. In this mode the system operates exactly the same as the conventional absorption refrigeration machine.

Figure 3:
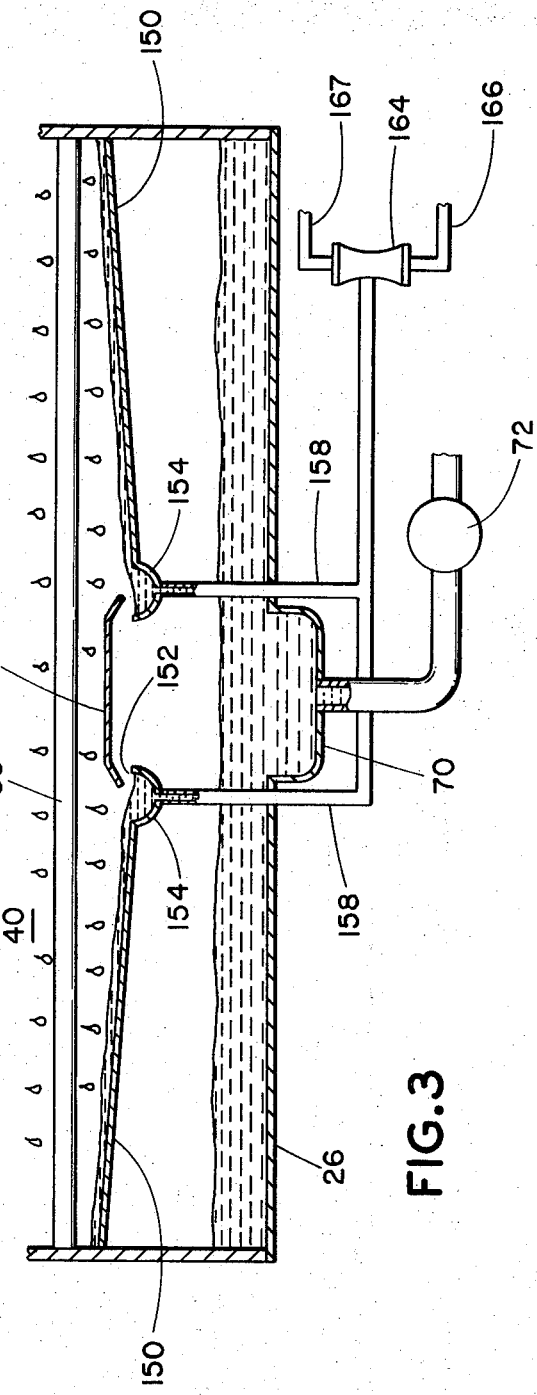
FIG. 3 is a view similar to FIG. 2 showing the system operating under free cooling conditions.

FIG. 3 is a view similar to FIG. 2 illustrating the flow of solution during free cooling operations. It can be seen that the solution level in the absorber shell is considerably higher than in normal operation. This is because a substantial portion of the absorbent solution is now being stored in the lower section of the absorber shell. The solution pump is run at partial flow sufficient to carry a small amount of solution back to the generator through line 178 during the free cooling operation so that the level remains relatively static with solution filling up the receiver or sump and the line leading to the solution pump. Valve 170 in tap-off line 166 is opened to allow fluid to pass to the motive fluid side of ejector 164 where it draws in the stream of refrigerant now being condensed on the absorber tube bundle and raining down into the pan. This refrigerant flows toward the center portion thereof to opening 152 but now it is intercepted by the trough 154 and flows through lines 158, 160 to the ejector. This mixed stream is carried upwardly to the refrigerant pan 32 where it is reintroduced into the refrigeration recirculation circuit.

It is not necessary that the pan collect all of the refrigerant being condensed on the absorber heat exchanger. In practice, some refrigerant will splash down into the absorbent solution stored in the lower portion of the shell. Eventually this is recovered when normal operation is resumed by boiling off in the generator. For most efficient operation, however, it is desirable to hold the loss to a minimum. The provision of the baffle 156 will help to some degree and additional baffle arrangements (not shown) around the pan may also be required.

It will be appreciated that the term "free cooling" as used herein does not mean absolutely "free," but rather operation at drastically reduced power input. Some heat must be supplied to the generator to prevent migration, as heretofore described, and several of the pumps must be operated thereby using power.

While this invention has been described in connection with a certain specific embodiment thereof it is to be understood that this is by way of illustration and not by way of limitation; and the scope of the appended claims should be construed as broadly as the prior art will permit.

What is claimed is:

1. An absorption refrigeration system comprising a generator, a condenser, an evaporator and an absorber connected in a closed, absorption refrigeration circuit; a common shell enclosing said evaporator and said absorber and having a lower portion thereof defining a sump; a first heat exchanger associated with said evaporator; a refrigeration circuit adapted to circulate refrigerant over said first heat exchanger and abstract heat from a fluid circulating therein; a second heat exchanger associated with said absorber through which a cooling medium may be circulated, said second heat exchanger being located above said sump; means for withdrawing absorbent solution collected in said sump and transferring at least a portion thereof over said second heat exchanger; means defining a first fluid flow path for absorbent solution passing over said second heat exchanger to said sump during normal operation of the system; and means defining a second, alternate fluid flow path for intercepting condensed refrigerant passing from the surface of said second heat exchanger and directing the same to said refrigeration circuit during the free cooling mode of said system, whereby solution may be stored in said sump during operation when refrigerant is being condensed on said second heat exchanger.

2. A system as defined in claim 1 including a pan located underneath said second heat exchanger and above said sump; drain means associated with said pan permitting flow from said pan to said sump and means for selectively intercepting fluid flowing from said pan to said sump, and conduit means for directing the same to said refrigeration circuit.

3. A system as defined in claim 2 wherein said pan includes a trough adjacent said drain means; and conduit means interconnecting said trough with said refrigerant circuit, whereby fluid flowing from said pan collects in said trough prior to being discharged into said drain means.

4. In a method of operating a refrigeration system of the type having an evaporator and an absorber connected in a closed circuit for normally conducting a refrigerant and an absorbent solution in an absorption refrigeration cycle, the absorber being arranged in the closed circuit to receive refrigerant vaporized in the evaporator and normally being provided with absorbent solution for absorption of the vaporized refrigerant; means defining a chilling circuit for circulating a chilled fluid in heat exchange relation with a refrigeration load and including a first heat exchanger in the evaporator for abstracting heat from the fluid and rejecting it to the refrigerant to chill the fluid and to vaporize the refrigerant; and means defining a cooling circuit for circulating a cooling medium and including a second heat exchanger in the absorber for normally abstracting heat from the absorbent solution and rejecting it to the cooling medium; the steps of operating the absorber to condense the vaporized refrigerant, by circulating the cooling medium in the second heat exchanger at a temperature lower than a temperature of the chilled fluid which will satisfy the refrigeration load; circulating refrigerant condensed in the absorber to the evaporator; storing absorbent solution in said absorber; and intercepting the flow of refrigerant condensing on said second heat exchanger and returning the same directly to said chilling circuit.

* * * * *